United States Patent [19]  [11] 3,734,696
Lucid et al.  [45] May 22, 1973

[54] VANADIUM RECOVERY FROM ACIDIC SOLUTIONS

[75] Inventors: Michael F. Lucid; William M. Leaders, both of Oklahoma City, Okla.

[73] Assignee: Kerr-McGee Corporation, Oklahoma City, Okla.

[22] Filed: Sept. 4, 1970

[21] Appl. No.: 69,938

[52] U.S. Cl. ............... 23/312 ME, 423/63, 23/312 P
[51] Int. Cl. .................... B01d 11/04, C01g 31/00
[58] Field of Search ............ 23/312 ME, 309, 312 A, 23/312 P, 165 C, 19.1 V; 423/63

[56] References Cited

UNITED STATES PATENTS

| | | | |
|---|---|---|---|
| 3,206,277 | 9/1965 | Burwell | 23/312 ME |
| 3,367,749 | 2/1968 | Koerner | 23/312 P |
| 3,131,993 | 5/1964 | Gustison | 23/321 ME |
| 3,348,906 | 10/1967 | Henrickson | 23/312 ME |
| 3,437,454 | 4/1969 | Shaw | 23/312 ME |
| 3,206,276 | 9/1965 | Burwell | 23/312 ME |
| 2,859,094 | 11/1958 | Schmitt | 23/312 ME |
| 2,937,925 | 5/1960 | Blake | 23/312 ME |
| 2,864,668 | 12/1958 | Baldwin | 23/312 ME |
| 2,812,233 | 11/1957 | Lewis | 23/312 ME |
| 3,223,476 | 12/1965 | Hart | 23/14.5 |

FOREIGN PATENTS OR APPLICATIONS

| | | | |
|---|---|---|---|
| 245,763 | 7/1963 | Australia | 23/19.1 |
| 70,866 | 1/1970 | East Germany | 23/19.4 |

OTHER PUBLICATIONS

Green, Metallurgia, Vol. 70, No. 422, Dec., 1964, pages 299–302.
Nuclear Science Abstracts, Vol. 20, No. 11, June 15, 1966, pages 2277–2278, No. 18561.
Nuclear Science Abstracts, Vol. 10, No. 18A, Sept. 10, 1956, page 905, No. 7573.
Nuclear Science Abstracts, Vol. 11, No. 4 Supp., Feb. 28, 1957, pages 253–254 No. 2356.
Ishimori, Nippon Genshiryokii Gakkaisha, Vol. 4, No. 2, 1962, pp. 117 thru 125.
Coleman, Proc. of International Conf. on Peaceful Uses of At. Energy, Vol. 28, 1958, pp. 278 to 288.

*Primary Examiner*—Norman Yudkoff
*Assistant Examiner*—S. J. Emery
*Attorney*—William G. Addison

[57] ABSTRACT

A method for the extraction of vanadium (V) from acidic mixtures containing fluoride comprising effecting the extraction with amines in a water-immiscible organic solvent, the vanadium being complexed with the extractant and being extracted into the organic phase.

4 Claims, No Drawings

VANADIUM RECOVERY FROM ACIDIC SOLUTIONS

BACKGROUND OF THE INVENTION

Phosphoric acid is generally produced commercially by one of two methods. One method is generally called the "furnace" method, and the other is generally referred to as the "wet process" method. In the wet process method of producing phosphoric acid, phosphate rock is contacted with a mineral acid such as sulfuric acid. Most phosphate rock contains metal compounds in varying amounts. In many cases these metal compounds are dissolved from the phosphate rock and appear in the wet process acid as contaminants. Vanadium compounds are among those dissolved from the phosphate rock, particularly when the rock is from the so-called Western phosphate deposits of Idaho, Wyoming, Utah and Montana.

Vanadium is an undesirable component of wet process phosphoric acid in that it prevents the use of the phosphoric acid in making animal feed supplements, as the amount of vanadium must be kept at a low level in such animal feed supplements.

On the other hand, vanadium itself is a valuable material and wet process phosphoric acid can be an important source of this material. Therefore, a process for the recovery of vanadium from wet process phosphoric acid provides an important benefit, in that the vanadium is converted from an undesirable contaminant to a valuable by-product.

Heretofore, attempts have been made to recover vanadium from wet process phosphoric acid. One involves addition of a soluble ferrocyanide compound to the acid to precipitate the vanadium, as described more fully in U.S. Pat. No. 1,544,911. Other such processes involve extraction of the acid with an organic extractant for the vanadium. U.S. Pat. No. 2,211,119 describes a process in which the preferred organic extractant is isopropyl ether. U.S. Pat. No. 3,437,454 describes a process in which the preferred organic extractant is an alpha-hydroxy oxime.

Other commercial process streams which contain vanadium exist. For instance, leaching of uranium ores with sulfuric acid frequently results in solutions containing vanadium, uranium, and iron. Another source of vanadium is ferrophosphorus, a by-product from electric furnace production of elemental phosphorus. Ferrophosphorus is roasted usually with salt or limestone and leached with water or acid. Further processing of these solutions by precipitation usually leaves low grade vanadium solutions which are sometimes processed by solvent extraction.

Amines and ammonium salts have been used for the recovery of these vanadium values from acidic solutions. However, below pH 1.3, vanadium is not extracted in significant amounts and residual vanadium frequently is left in the aqueous raffinate even at a higher pH.

Accordingly, improved processes are the effort of much research to recover vanadium from commercial sources under favorable conditions and in improved yields.

SUMMARY OF THE INVENTION

In accordance with this invention, it has been discovered that vanadium can be recovered from wet process phosphoric acid by extraction of the acid at a pH of from about 0.0 to about 1.5 using an organic extractant comprising a hydrocarbon solvent and at least one amine. The vanadium values are extracted from the acid into the organic phase, and the loaded organic phase can then easily be separated from the wet process acid due to the immiscibility of the acid and the organic phase. The vanadium values can then be recovered from the organic phase, as for example by stripping with a suitable stripping solution such as a 10 percent solution of sodium carbonate. The vanadium may be precipitated from the stripping solution by conventional prior art methods.

In accordance with another aspect of the present invention, it has been discovered that if phosphine oxides are combined with the extractants described above, the combination is effective to extract vanadium (V) from acidic solutions other than wet process phosphoric acid. Further, if fluoride is present in such solutions, the combination is an effective extractant even if the solution has a low pH, for example, about 0.0 to 1.5.

Examples of suitable primary amines include a mixture of C-18 to C-22 aliphatic primary amines. Aliphatic amines corresponding to such a mixture include "Primene JMT" (Rohm & Haas Co.). One of the preferred amines of this mixture which may also be used alone is a C-20 primary alkylamine of the formula

Also illustrative of suitable primary amines is a mixture of C-12 to C-14 primary alkylamines. A commercially available mixture of such amines is "Primene 81-R" (Rohm & Haas Co.). A typical amine of this mixture is the C-12 alkylamine of the formula

Examples of suitable secondary amines include bis(1-isobutyl-3,5-dimethyl-hexyl) amines, and mixtures of N-dodecenyl(trialkylmethyl) amines and mixtures of N-lauryl (trialkylmethyl) amines. Examples of mixtures of N-dodecenyl (trialkylmethyl) amines are those which are a C-12 to C-15 homologous mixture such as "Amberlite LA-1" (Rohm & Haas Co.). An amine of this mixture which also may be used alone has the formula

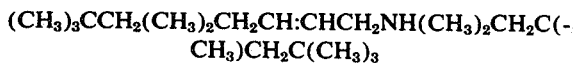

Mixtures of N-lauryl(trialkylmethyl) amines include homologous mixtures of C-12 to C-15 amines such as "Amberlite LA-1" (Rohm & Haas Co.). A typical amine of this mixture has the formula

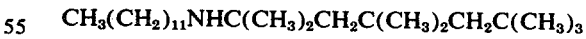

Examples of suitable tertiary amines include tricaprylyl amine, trilauryl amine, triisooctyl amine, tritridecyl amine and mixtures of tertiary amines, such as a mixture of C-8, C-10 and C-12 tertiary alkyl amines commercially available as "Adogen 368" (Ashland Chemical Co.).

Examples of suitable quaternary amines are tricaprylylmethyl ammonium chloride and tritridecylmethyl ammonium chloride.

Examples of alkyl phosphine oxides include tri-n-octylphosphine oxide, tri-n-decylphosphine oxide and tris-(2-ethylhexyl) phosphine oxide.

Other modifiers may optionally be added to the extractant mixture, such as tributylphosphate, long chain aliphatic alcohols, and the like.

Generally, the total amount of the novel extractant will vary from about 1 to 50 percent by weight based on the total weight of the organic phase. A preferred percentage range is from 2 to 15 percent. The ratio of the organic phase to the acidic phase is not critical.

The term "water-immiscible organic solvent" as used herein refers to an organic material normally liquid at ambient temperatures which is substantially, but not necessarily entirely, insoluble in water. The preferred organic solvents for the process of the present invention are hydrocarbons. Examples of suitable hydrocarbon solvents include isooctane, kerosene, "Soltrol 170" (a commercially available naphthenic hydrocarbon solvent), benzene, toluene, xylene, isodecane, fuel oils, mineral oils, hexane, heptane, octane, "Panasols" (commercially available petroleum aromatic solvents), "Napoleum 470" (commercially available petroleum naphtha), and the like. Solvents which contain functional groups can also be employed providing that the functional groups do not adversely affect the extraction. Thus, chlorinated and fluorinated hydrocarbons such as carbon tetrachloride, trichloroethylene, and perfluorokerosene may be used.

It has been found in the practice of this invention that fluoride must be present in the wet process phosphoric acid in order for the extractants of the present invention to properly complex the vanadium(V). Although the exact theory of the complexing is not known, it is believed that the fluoride is complexed with the vanadium(V) and the complexing agent.

The amount of fluoride present in the mixture preferably is about 0.25 mole per mole of vanadium present although a large excess of fluoride does not harm the extraction.

Fluoride is a natural component of wet process phosphoric acid and therefore wet process phosphoric acid is particularly suited for the extraction process of the present invention.

With respect to the treatment of wet process phosphoric acid, the present invention comprises the treatment of the raw acid with an oxidizing agent prior to extraction, so that the vanadium is converted to the pentavalent state. Without converting the vanadium to the pentavalent state, the extraction process with the complexing agents of the invention is not satisfactory, as vanadium in the lower oxidation state does not form a complex with the extractants contemplated within the scope of the invention.

It has been found that contact time between the organic extractant phase and the wet acid phase is an important variable to consider when extracting vanadium from wet acid. Longer contact times result in increased vanadium extraction. In practice, contact times of from about 1 minute to 60 are satisfactory with about 5 minutes to 30 minutes per contact being especially preferred at temperatures of from about 30° – 50° C.

The extraction is performed on a batch basis, or on a continuous basis, such as in a continuous countercurrent multistage extraction system.

The foregoing description and the following specific examples are for purposes of illustration, and are not to be considered as limiting the scope of the invention, reference being had to the appended claims for this purpose.

EXAMPLE I

Commercial wet process phosphoric acid containing 1.6 g/l of $V_2O_5$ was oxidized with sodium chlorate to insure all of the vanadium was in the pentavalent state. This solution was contacted for 10 minutes with equal volumes of the quaternary amine tricaprylylmonomethylammonium chloride in Napoleum 470. The following table gives the percent vanadium extracted as a function of amine concentration.

| Amine (Molarity) | $V_2O_5$ extracted (%) |
|---|---|
| 0.005 | 31.4 |
| 0.011 | 52.3 |
| 0.014 | 64.2 |
| 0.016 | 64.5 |
| 0.027 | 71.7 |
| 0.054 | 79.8 |

Similar results were obtained using primary, secondary and tertiary amines.

EXAMPLE II

Commercial wet process phosphoric acid was oxidized with sodium chlorate to raise the vanadium contained therein to the pentavalent state. Portions of this aqueous solution were contacted with equal volumes of organic extractant solutions for 2 minutes at ambient temperature. The aqueous raffinate from each extraction was recontacted with fresh organic solution and this procedure was repeated for a total of six stages. Each organic solution contained 0.05 M amine 0.05 M tri-n-octylphosphine oxide, 5 percent tributylphosphate in Napoleum 470. Primary, secondary, tertiary and quaternary amines were tested. The following table gives the vanadium analysis of the aqueous solutions showing a high level of vanadium extraction is attained.

| Amine | Stage $V_2O_5$ (g./l.) (aqueous) | | | | | | |
|---|---|---|---|---|---|---|---|
| | 0 | 1 | 2 | 3 | 4 | 5 | 6 |
| Tricaprylyl amine | 1.58 | 0.28 | 0.21 | 0.12 | 0.10 | 0.12 | 0.12 |
| Trilauryl amine | 1.57 | 0.40 | 0.22 | Poor break time | | | |
| Triisooctyl amine | 1.22 | 0.42 | 0.39 | 0.35 | 0.35 | 0.33 | 0.33 |
| Tritridecyl amine | 1.57 | 0.58 | 0.31 | 0.22 | 0.16 | 0.16 | 0.16 |
| Tritridecylmethyl ammonium chloride | 1.57 | | | | | 0.23 | |
| Tricaprylylmethyl ammonium chloride | 1.57 | 0.27 | 0.23 | 0.23 | 0.23 | 0.21 | 0.21 |
| Bis (1-isobutyl-3,5-dimethylhexyl) amine | 1.57 | 0.65 | 0.43 | 0.27 | 0.21 | 0.21 | 0.20 |
| N-dodecenyl (trialkylmethyl) amine: trialkylmethyl=homologous mixture, 12-15 carbon atoms | 1.57 | 0.54 | 0.40 | 0.29 | 0.29 | 0.29 | 0.28 |
| N-lauryl (trialkylmethyl) amine: trialkylmethyl=homologous mixture, 12-15 carbon atoms | 1.57 | 0.56 | 0.43 | 0.38 | 0.24 | 0.19 | 0.17 |
| Trialkylmethyl amine: homologous mixture, 18-22 carbon atoms | 1.57 | 0.27 | 0.27 | 0.22 | 0.22 | 0.22 | 0.22 |
| Trialkylmethylamine: homologous mixture $C_{12}$–$C_{14}$ | 1.57 | 0.47 | 0.34 | 0.31 | 0.28 | 0.27 | 0.26 |

In general, the extraction efficiency decreases as the temperature is increased, although in some instances it may not be practical to operate at ambient temperature conditions.

EXAMPLE III

An experiment with mixtures of tri-n-octylphosphine oxide with the trialkyl amine tricaprylyl amine in one case and the the quaternary amine tricaprylylmonomethylammonium chloride in another case show the effect of different amine to phosphine oxide ratios on extraction of vanadium from wet process phosphoric acid.

| Organic composition (molar) | | | Stage V₂O₅ (g./l.) (aqueous) | | | | | | |
|---|---|---|---|---|---|---|---|---|---|
| Tricaprylyl amine | Tricaprylyl-methyl ammonium chloride | TOPO | 0 | 1 | 2 | 3 | 4 | 5 | 6 |
| 0.01 | | 0.09 | 1.57 | 0.81 | 0.45 | 0.36 | 0.36 | 0.31 | 0.27 |
| 0.03 | | 0.07 | 1.57 | 0.54 | 0.27 | 0.20 | 0.22 | 0.16 | 0.16 |
| 0.05 | | 0.05 | 1.58 | 0.28 | 0.21 | 0.12 | 0.10 | 0.12 | 0.12 |
| 0.07 | | 0.07 | 1.55 | 0.36 | 0.20 | 0.18 | 0.20 | 0.14 | 0.13 |
| | 0.01 | 0.09 | 1.57 | 0.85 | 0.49 | 0.43 | 0.36 | 0.31 | 0.31 |
| | 0.03 | 0.07 | 1.57 | 0.45 | 0.27 | 0.22 | 0.27 | 0.19 | 0.20 |
| | 0.05 | 0.05 | 1.57 | 0.27 | 0.23 | 0.23 | 0.23 | 0.21 | 0.21 |
| | 0.07 | 0.03 | 1.57 | 0.27 | 0.22 | 0.20 | 0.20 | 0.15 | 0.16 |

What is claimed is:

1. A process which comprises extracting vanadium (V) from an aqueous acidic solution having a pH of from about 0.0 to about 1.5 and containing fluoride in an amount of at least about 0.25 mole per mole of vanadium by contacting said solution with an organic phase containing as the extractant at least one aliphatic amine in a hydrocarbon solvent therefor to form an organic phase containing the vanadium separate from an aqueous phase; removing the organic phase and recovering the vanadium from the organic phase by treatment with an alkaline stripping solution.

2. A process as set forth in claim 1 wherein said acidic solution is wet process phosphoric acid.

3. A process as set forth in claim 1 in which the amine is selected from the group consisting of primary, secondary, tertiary and quaternary amines.

4. A process as set forth in claim 1 wherein said fluoride is present in said acidic solution in an amount of about 0.25 mole per mole of vanadium.

* * * * *